United States Patent
Iida et al.

(10) Patent No.: US 9,725,610 B2
(45) Date of Patent: Aug. 8, 2017

(54) INK COMPOSITION FOR INK JET RECORDING

(71) Applicant: Seiko Epson Corporation, Tokyo (JP)

(72) Inventors: Keiji Iida, Chikuhoku-mura (JP);
Makoto Nagase, Shiojiri (JP);
Kenichiro Kubota, Matsumoto (JP);
Akihito Sao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 374 days.

(21) Appl. No.: 14/608,618

(22) Filed: Jan. 29, 2015

(65) Prior Publication Data

US 2015/0210878 A1 Jul. 30, 2015

(30) Foreign Application Priority Data

Jan. 29, 2014 (JP) .................. 2014-014334

(51) Int. Cl.
| | |
|---|---|
| *C09D 11/36* | (2014.01) |
| *C09D 11/322* | (2014.01) |
| *C09D 11/324* | (2014.01) |
| *C09D 11/326* | (2014.01) |
| *C09D 11/38* | (2014.01) |

(Continued)

(52) U.S. Cl.
CPC ............ *C09D 11/36* (2013.01); *C08K 3/04* (2013.01); *C08K 5/06* (2013.01); *C08K 5/3417* (2013.01); *C09D 11/324* (2013.01); *C09D 11/38* (2013.01); *C09D 133/00* (2013.01); *C08K 5/0091* (2013.01); *C08K 5/20* (2013.01)

(58) Field of Classification Search
CPC ..... C09D 11/36; C09D 11/322; C09D 11/324; C09D 11/326; C09D 11/38; C08K 5/3417; C08K 5/20; C08K 5/0091

USPC ..................................................... 106/31.78
See application file for complete search history.

(56) References Cited

U.S. PATENT DOCUMENTS 8,840,233 B2 * 9/2014 Sao ................. C09D 11/322
347/100
8,858,696 B2 * 10/2014 Sao ................. C09D 11/36
106/31.75

(Continued)

FOREIGN PATENT DOCUMENTS

JP 2012-219131 A 11/2012
JP 2013-155275 A 8/2013

*Primary Examiner* — Helene Klemanski
(74) *Attorney, Agent, or Firm* — Nutter McClennen & Fish LLP; John J. Penny, Jr.

(57) ABSTRACT

A non-aqueous ink composition for ink jet recording includes a pigment, a compound represented by General formula 1 below, and a phthalocyanine derivative provided with a polar group not having an amine structure, as a pigment dispersant for dispersing the pigment. The pigment is carbon black. The composition further includes an alkylene glycol monoalkyl ether:

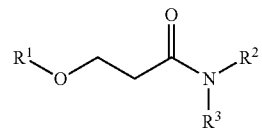

(1)

(wherein $R^1$ indicates an alkyl group of 1 to 4 carbon atoms, and $R^2$ and $R^3$ each independently indicate a methyl group or an ethyl group).

9 Claims, 1 Drawing Sheet

(51) Int. Cl.
*C08K 5/20* (2006.01)
*C08K 5/3417* (2006.01)
*C08K 3/04* (2006.01)
*C08K 5/06* (2006.01)
*C09D 133/00* (2006.01)
*C08K 5/00* (2006.01)

(56) References Cited

U.S. PATENT DOCUMENTS

| | | | | |
|---|---|---|---|---|
| 8,992,678 B2* | 3/2015 | Sao | ............... | C09D 11/322 106/31.75 |
| 9,028,055 B2* | 5/2015 | Kubota | ............... | C09D 11/36 347/100 |
| 9,056,992 B2* | 6/2015 | Sao | ............... | C09D 11/36 |
| 9,206,327 B2* | 12/2015 | Maki | ............... | C09D 11/322 |
| 2010/0026743 A1* | 2/2010 | Van Thillo | ............... | C09D 11/322 106/31.6 |
| 2010/0029813 A1* | 2/2010 | Deroover | ............... | C09D 11/101 524/93 |
| 2010/0047455 A1* | 2/2010 | Hoogmartens | ............... | C09D 11/322 427/258 |
| 2012/0083567 A1* | 4/2012 | Hosoya | ............... | C09D 11/36 524/516 |
| 2013/0194362 A1 | 8/2013 | Sao et al. | | |
| 2013/0260037 A1* | 10/2013 | Paiz | ............... | C09D 11/322 427/256 |
| 2014/0092165 A1* | 4/2014 | Mayo | ............... | C09D 11/322 106/31.61 |
| 2014/0092182 A1* | 4/2014 | Mayo | ............... | C09D 11/322 106/31.61 |

* cited by examiner

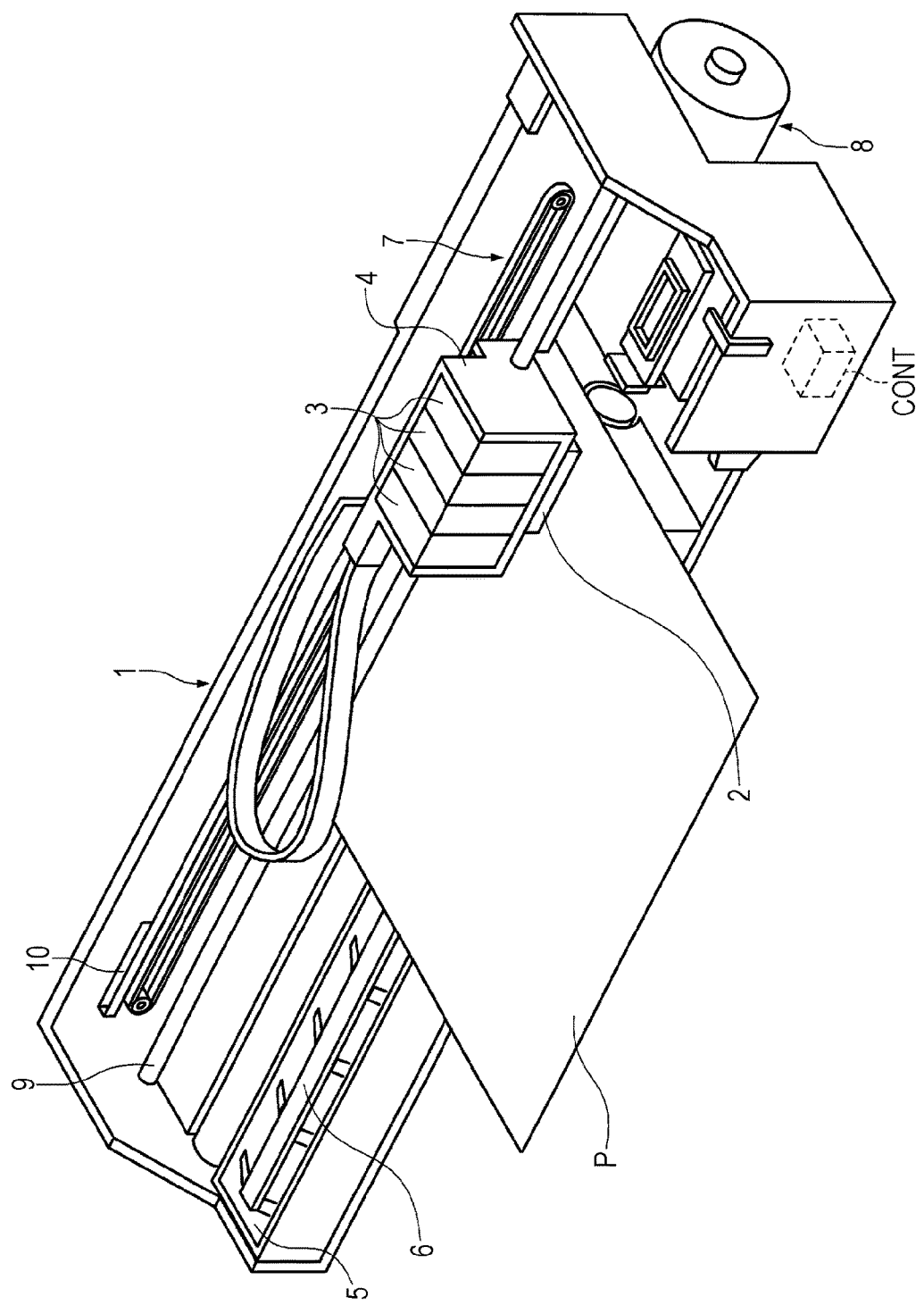

INK COMPOSITION FOR INK JET RECORDING

BACKGROUND

1. Technical Field

The present invention relates to an ink composition for ink jet recording.

2. Related Art

There has been known an ink jet recording apparatus for recording images and characters by ejecting fine droplets of an ink composition from a nozzle hole of a recording head to attach these fine droplets onto a recording medium. As an ink composition used in related recording, a water-based (aqueous) ink composition, in which a pigment, a pigment dispersant, a resin, and the like are dispersed or dissolved in water, has been known. Furthermore, a non-aqueous (oil-based) ink composition, in which a pigment, a pigment dispersant, resin, and the like are dispersed or dissolved in an organic solvent without containing water, has been developed.

Among the above ink compositions, a non-aqueous ink composition has been widely used because, in regard to a recording medium having a recording surface made of plastic (for example, vinyl chloride, polyester, polypropylene, polyethylene, or the like), the wet-spreading property of ink is good, or the fixing property of ink is good. For example, JP-A-2013-155275 discloses a non-aqueous ink composition for ink jet recording, containing an amide-based solvent (ether amides).

In addition, there is a case where a pigment dispersant, such as a resin dispersant, a pigment derivative (synergist), or the like, is added to a non-aqueous ink composition in order to improve the storage stability of ink by improving the dispersibility of pigment. For example, it is described in JP-A-2012-219131 that a pigment dispersed resin, a pigment derivative having a phthalocyanine skeleton, or the like is used.

The pigment derivative, as described in JPA-2012-219131, has a property of hardly dissolving in water, whereas has a property of easily dissolving in an organic solvent. Therefore, this pigment derivative tends to be separated from a pigment in ink, and tends to exist in a state of being eluted in a solvent. Particularly, when the amide-based solvent described in JP-A-2013-155275 is used, the pigment derivative is easily eluted in a solvent.

However, the amide-based solvent described in JP-A-2013-155275, compared to other organic solvents (for example, lactone, glycol ethers and the like), has an advantage of being excellent in the fixing property and the drying property of the recorded image, but has a property of high water absorption. Therefore, when a non-aqueous ink composition containing an amide-based solvent and a pigment derivative is stored for a long period of time, there occurs a problem that the pigment derivative eluted in a solvent hardly dissolves in the ink that comes to have a high water content, and thus this pigment derivative is precipitated as foreign matter. That is, foreign matter derived from the pigment derivative tends to be remarkably generated when the pigment derivative is used in combination with the amide-based solvent.

Thus, it was difficult to obtain an ink having excellent storage stability of the generation of foreign matter and the change of viscosity being lowered while improving the abrasion resistance (fixing property) of a recorded image.

SUMMARY

An advantage of some aspects of the invention is to provide a non-aqueous ink composition for ink jet recording, which is excellent in storage stability while improving the abrasion resistance of a recorded image.

The invention can be realized in the following forms or application examples.

Application Example 1

A non-aqueous ink composition for ink jet recording according to this Application Example of the invention includes: a pigment; a compound represented by General Formula (1) below; and a phthalocyanine derivative provided with a polar group not having an amine structure, as a pigment dispersant for dispersing the pigment:

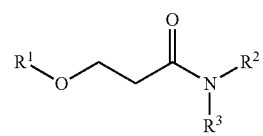

wherein $R^1$ indicates an alkyl group of 1 to 4 carbon atoms, and $R^2$ and $R^3$ each independently indicate a methyl group or an ethyl group.

Application Example 2

In Application Example 1, the pigment may be carbon black.

Application Example 3

In Application Example 1 or 2, the non-aqueous ink composition may further include an alkylene glycol monoalkyl ether.

Application Example 4

In Application Example 3, the content of the alkylene glycol monoalkyl ether may be more than or equal to 1 mass % and less than or equal to 40 mass %, based on the total mass of the non-aqueous ink composition.

Application Example 5

In any one of Application Examples 1 to 4, the content of the compound represented by General Formula (1) above may be more than or equal to 5 mass % and less than or equal to 50 mass %, based on the total mass of the non-aqueous ink composition.

Application Example 6

In any one of Application Examples 1 to 5, the non-aqueous ink composition may further include at least one resin of a vinyl chloride-based resin and a (meth)acryl-based resin.

Application Example 7

In Application Example 6, the content of the resin may be more than or equal to 0.5 mass % and less than or equal to 10 mass %, based on the total mass of the non-aqueous ink composition.

Application Example 8

In any one of Application Examples 1 to 7, the content of the phthalocyanine derivative may be more than or equal to 1 part by mass and less than or equal to 20 parts by mass, based on 100 parts by mass of the pigment.

Application Example 9

In any one of Application Examples 1 to 8, the non-aqueous ink composition may further include a compound other than the phthalocyanine derivative, as the pigment dispersant.

BRIEF DESCRIPTION OF THE DRAWING

The invention will be described with reference to the accompanying drawing, wherein like numbers reference like elements.

FIGURE is a perspective view schematically showing a configuration of an ink jet printer that can be used in the present embodiment.

DESCRIPTION OF EXEMPLARY EMBODIMENTS

Hereinafter, some embodiments of the invention will be described. Embodiments to be described below are intended to illustrate an example of the invention. The invention is not limited to the following embodiments, and includes various modifications carried out within a range in which the gist of the invention does not change. All configurations to be described below are not necessarily essential configurations of the invention.

The "image" in the invention shows a printing pattern that is formed from the dot group, and also includes text printing and solid printing.

The "non-aqueous ink composition" in the invention is an ink composition that uses an organic solvent, not water, as a main solvent. The content of water in this composition is preferably less than or equal to 3 mass %, more preferably less than or equal to 1 mass %, still more preferably less than 0.05 mass %, further preferably less than 0.01 mass %, still further preferably less than 0.005 mass %, and the most preferably less than 0.001 mass %. Alternatively, this non-aqueous ink composition may be an ink composition that does not substantially contain water. The sentence "the ink composition does not substantially contain water" means that water is not intentionally contained in the ink composition.

1. Non-Aqueous Ink Composition

The non-aqueous ink composition for ink jet recording according to an embodiment of the invention (hereinafter, simply referred to as "non-aqueous ink composition") includes a pigment; a compound represented by General Formula (1) below; and a phthalocyanine derivative provided with a polar group not having an amine structure, as a pigment dispersant for dispersing the pigment. The compound represented by General Formula (1) below is an organic solvent functioning as a solvent of the non-aqueous ink composition.

Hereinafter, components contained in the non-aqueous ink composition for ink jet recording according to the present embodiment and components that can be contained therein will be described in detail.

1.1. Pigment

The non-aqueous ink composition according to the present embodiment contains a pigment. Examples of the pigment include inorganic pigments and organic pigments.

Among pigments, examples of inorganic pigments include carbon blacks, iron oxides, and titanium oxides. Examples of the carbon blacks include, but are not particularly limited to, furnace black, lamp black, acetylene black, and channel black (C.I. Pigment Black 7). Further, examples of commercially available products of carbon blacks include No. 2300, No. 900, MCF88, No. 20B, No. 33, No. 40, No. 45, No. 52, MA7, MA8, MA100, and No. 2200B (all are trade names, manufactured by Mitsubishi Chemical Corporation); Color Black FW1, Color Black FW2, Color Black FW2V, Color Black FW18, Color Black FW200, Color Black 5150, Color Black 5160, Color Black 5170, Pritex 35, Pritex U, Pritex V, Pritex 140U, Special Black 6, Special Black 5, Special Black 4A, Special Black 4, Special Black 250, or the like (all are trade names, manufactured by Degussa AG); Conductex SC, Raven 1255, Raven 5750, Raven 5250, Raven 5000, Raven 3500, Raven 700, or the like (all are trade names, manufactured by Columbian Carbon Japan, Ltd.); and Regal 400R, Regal 330R, Regal 660R, Mogul L, Monarch 700, Monarch 800, Monarch 880, Monarch 900, Monarch 1000, Monarch 1100, Monarch 1300, Monarch 1400, Elftex 12, or the like (all are trade names, manufactured by CABOT Corporation).

Examples of organic pigments include quinacridone-based pigments, quinacridonequinone-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, and azo-based pigments.

Among the above pigments, it is preferable to use at least one of carbon black and phthalocyanine pigments in terms of the non-aqueous ink composition according to the present embodiment being excellent in dispersibility when a phthalocyanine derivative (to be described later) is used in this non-aqueous ink composition.

Here, when a phthalocyanine-based pigment is used as the pigment, it is difficult for a phthalocyanine derivative to detach from the phthalocyanine-based pigment because the pigment and the phthalocyanine derivative have a common structure (phthlocyanine skeleton). In contrast, since carbon black does not have a phthalocyanine skeleton, it is easy for the phthalocyanine derivative to detach from the carbon black. The detached phthalocyanine derivative is easily converted into foreign matter in the ink that comes to be higher in water content by the water absorption action of a solvent. However, according to the non-aqueous ink composition of the present embodiment, since a phthalocyanine derivative having a specific structure (to be described later) is used, the problem of the phthalocyanine derivative being converted into foreign matter hardly occurs even when the phthalocyanine derivative is detached from the pigment. Thus, the non-aqueous ink composition according to the present embodiment can satisfactorily exhibit its effects even when carbon black is used as the pigment.

The content of the pigment can be appropriately set, if necessary, and is not particularly limited, but, for example, is preferably more than or equal to 0.1 mass % and less than or equal to 25 mass %, and more preferably more than or equal to 1 mass % and less than or equal to 10 mass %, based on the total mass (100 mass %) of the non-aqueous ink composition.

1.2. Organic Solvent
1.2.1. Compound Represented by General Formula (1)

The non-aqueous ink composition according to the present embodiment contains a compound represented by General Formula (1) below.

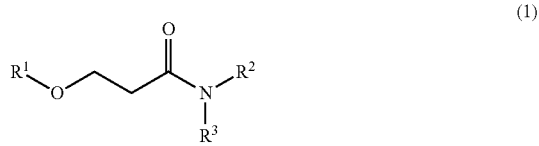
(1)

In General Formula (1) above, $R^1$ indicates an alkyl group of 1 to 4 carbon atoms, and $R^2$ and $R^3$ each independently indicate a methyl group or an ethyl group. The "alkyl group of 1 to 4 carbon atoms" may be a linear or branched alkyl group, for example, a methyl group, an ethyl group, a n-propyl group, an iso-propyl group, a n-butyl group, a sec-butyl group, an iso-butyl group, or a tert-butyl group. The compound represented by General Formula (1) above may be used alone or in a mixture of two or more.

The function of the compound represented by General Formula (1) above is to increase the surface drying property and the fixing property of the ink applied on a recording medium having low ink absorptivity. In particular, the compound represented by General Formula (1) above is excellent in the effect of appropriately dissolving a vinyl chloride resin. Therefore, the compound represented by General Formula (1) above dissolves a recording surface containing a vinyl chloride resin to allow the ink to permeate into the recording medium. In this way, when the ink permeates into the recording medium, the ink is strongly fixed, and the surface of the ink is easily dried. Accordingly, the obtained image is excellent in a surface drying property and a fixing property (abrasion resistance).

Since the compound represented by General Formula (1) above has high water absorptivity (hygroscopicity) even in the organic solvent to be described later, water is easily contained in the non-aqueous ink composition containing this composition. Therefore, when a general phthalocyanine derivative is used as a pigment dispersant, the generation of foreign matter due to the phthalocyanine derivative is particularly noticeable. For such a problem, a phthalocyanine derivative having a specific structure is used in the non-aqueous ink composition according to the present embodiment, and thus the generation of foreign matter can be effectively suppressed even when this composition contains the compound represented by General Formula (1) above. Therefore, the non-aqueous ink composition according to the present embodiment is excellent in storage stability, and can record an image having excellent abrasion resistance.

Further, in Formula (1) above, it is preferable that $R^1$ is a methyl group or an n-butyl group. Thus, there is a case where the abrasion resistance and the surface drying property of an image are further improved.

The HLB value of the compound represented by General Formula (1) above is preferably more than or equal to 8.0 and less than or equal to 20.0, more preferably more than or equal to 8.5 and less than or equal to 18.5, and particularly preferably more than or equal to 12.0 and less than or equal to 18.5. When the HLB value of the compound represented by General Formula (1) above is within the above range, it is more preferable in terms of interaction with a vinyl chloride resin. The HLB value in the present specification refers to a value calculated by Equation (i) based on the ratio of non-polar value (I) and organic value (O) in the organic conceptual diagram (hereinafter, referred to as "I/O value").

$$\text{HLB value} = (\text{non-polar value } (I)/\text{organic value } (O)) \times 10 \quad (i)$$

Specifically, I/O value may be calculated based on each of the documents: Atsushi Fujita, "Systematic organic qualitative analysis mixture", Kazama Shobo, 1974; Nobuhiko Kuroki, "Staining theoretical chemistry", Makishoten, 1966; and Hiroo Inoue, "Organic compound separation method", Shokabo, 1990.

The content of the compound represented by General Formula (1) above is preferably more than or equal to 5 mass % and less than or equal to 50 mass %, more preferably more than or equal to 5 mass % and less than or equal to 40 mass %, and still more preferably more than or equal to 5 mass % and less than or equal to 35 mass %, based on the total mass (100 mass %) of the non-aqueous ink composition. When the content of the compound represented by General Formula (1) above is more than or equal to 5 mass %, the abrasion resistance and the surface drying property of an image can be further improved, and when the content thereof is less than or equal to 50 mass %, the generation of agglomerates due to copper phthalocyanine derivative can be further suppressed.

1.2.2. Alkylene Glycol Monoalkyl Ether

It is preferable that the non-aqueous ink composition according to the present embodiment contains alkylene glycol monoalkyl ether. Alkylene glycol monoalkyl ether has a function of improving the wet-spreading property of ink, and particularly, effectively acts on a recording medium having low ink absorptivity. Thus, the dot diameter of liquid droplets adhered on the recording medium can be increased, and an image having excellent glossiness can be recorded, thereby improving the image quality of the resulting image. Particularly, when alkylene glycol monoalkyl ether is used in combination with the compound represented by General Formula (1) above, an image having both image quality and abrasion resistance can be recorded.

Examples of alkylene glycol monoalkyl ether include ethylene glycol monomethyl ether, ethylene glycol monoethyl ether, ethylene glycol mono-isopropyl ether, ethylene glycol monobutyl ether, ethylene glycol mono hexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, dipropylene glycol monoethyl ether, and the like. These compounds may be used alone or in a combination of two or more thereof. Among these, it is preferable that the alkylene glycol monoalkyl ether having a normal boiling point of lower than or equal to 280° C. (preferably higher than or equal to 120° C. and lower than equal to 280° C.) is used in terms of improving the wet-spreading property of ink and the glossiness of the recorded image and simultaneously making the drying property of the image good to suppress the occurrence of uneven printing of the image.

When the non-aqueous ink composition contains alkylene glycol monoalkyl ether, the content thereof is preferably more than or equal to 1 mass % and less than or equal to 40 mass %, and more preferably more than or equal to 1 mass % and less than or equal to 35 mass %, based on the total mass (100 mass %) of the non-aqueous ink composition. When the content of alkylene glycol monoalkyl ether is more than or equal to 1 mass %, the wet-spreading property of an ink and the glossiness of an image are further improved, and when the content thereof is less than or equal to 40 mass %, the drying property of the recorded image is improved, and thus there is a tendency to suppress the occurrence of uneven printing.

1.2.3. Organic Solvents Other than the Above

The non-aqueous ink composition according to the present embodiment may contain organic solvents other than above (that is, organic solvents other than the compound represented by General Formula (1) above and alkylene glycol monoalkyl ether). Specific examples of the organic solvents other than above include glycol ethers (excluding the above-described alkylene glycol monoalkyl ether, for example, alkylene glycol dialkyl ether, and the like), lactones (for example, γ-butyrolactone and the like), alcohols (for example, ethyl alcohol, 1-propanol, fluorinated alcohol, and the like), and ethers (for example, diethyl ether, dipropyl ether, and the like).

When the non-aqueous ink composition contains the organic solvents other than above, the content thereof, for example, may be more than or equal to 5 mass % and less than or equal to 30 mass %, based on the total mass (100 mass %) of the non-aqueous ink composition.

1.3. Pigment Dispersant 1.3.1. Phthalocyanine Derivative Having Specific Structure The non-aqueous ink composition according to the present embodiment contains a phthalocyanine derivative provided with a polar group not having an amine structure, as a pigment dispersant. In the present specification, there is a case where the "phthalocyanine derivative provided with a polar group not having an amine structure" refers to a "phthalocyanine derivative having a specific structure".

The phthalocyanine derivative having a specific structure is a so-called pigment derivative (synergist). The pigment derivative is adsorbed in a pigment or present in the vicinity of the pigment, and functions to improve the dispersibility of the pigment. Thus, viscosity change and the like caused by the lowering of the dispersibility of the pigment can be favorably suppressed.

The phthalocyanine derivative having a specific structure exhibits properties of excellent solubility in water by the action of the provided polar group not having amine structure. Therefore, even if the content of water in the ink is increased by the compound represented by the General Formula (1) above, the phthalocyanine derivative having a specific structure is readily soluble in water, and thus it is possible to reduce the generation of foreign matter. Thus, with the use of the phthalocyanine derivative having a specific structure, it is possible to obtain the ink with excellent storage stability due to the reduction in the generation of foreign matter or the change of viscosity.

Here, examples of the "polar group having an amine structure" include a quaternary ammonium group ($-N^+R^1R^2R^3X^-$), an amino group ($-NH_2$, $-NHR^4$, $-NR^4R^5$), and a group having an amine skeleton, in which an atom other than a nitrogen atom constituting the amine skeleton is bonded to phthalocyanine (for example, $-CONHR^6$, $-SO_2NHR^6$, $-OCONHR^6$, $-CONHCOR^6$, $-CONHSO_2R^6$, or the like). $R^1$, $R^2$, and $R^3$ are each independently a hydrogen atom, a substituted or unsubstituted alkyl group, or a substituted or unsubstituted aryl group, and $X^-$ is a counter ion. In addition, $R^4$ and $R^5$ are each independently a substituted or unsubstituted alkyl group, or a substituted or unsubstituted aryl group. $R^6$ is a hydrogen atom, a substituted or unsubstituted alkyl group, or a substituted or unsubstituted aryl group. Examples of substituent groups, in each of which an alkyl group and an aryl group are substituted, include a sulfonic acid group, a carboxyl group, a hydroxyl group, and the like.

The "polar groups not having an amine structure" may be polar groups other than the above polar groups having an amine structure. Examples thereof include a sulfonic acid group, a carboxyl group, and the like. These exemplified polar groups are preferably used in terms of imparting particularly excellent hydrophilicity to a phthalocyanine derivative. Among the exemplified polar groups not having an amine structure, a sulfonic acid group is preferable in terms of further improving the solubility of a phthalocyanine derivative in water.

Further, as the phthalocyanine derivative having a specific structure, it is preferable to use those that form a complex with a metal in terms of excellent color developing properties. Among these phthalocyanine derivatives forming a complex with a metal, a copper phthalocyanine derivative having copper as a central metal can be more preferably used.

When two or more polar groups are introduced per one molecule of the phthalocyanine derivative having a specific structure, one or more of the introduced polar groups are polar groups not having an amine structure, preferably 50% or more thereof (for example, five or more when ten polar groups are introduced) are polar groups not having an amine structure, more preferably 70% or more thereof (for example, seven or more when ten polar groups are introduced) are polar groups not having an amine structure, and particularly preferably 90% or more thereof (for example, nine or more when ten polar groups are introduced) are polar groups not having an amine structure. Thus, it is difficult for the phthalocyanine derivative having a specific structure to be converted into foreign matter in ink.

As the phthalocyanine derivative having a specific structure, a commercially available product thereof can also be used, and an example of the commercially available product thereof includes Solsperse 12000 (trade name, manufactured by LUBRIZOL Corporation).

The content of the phthalocyanine derivative having a specific structure is preferably more than or equal to 1 part by mass and less than or equal to 20 parts by mass, more preferably more than or equal to 1 part by mass and less than or equal to 10 parts by mass, and still more preferably more than or equal to 1 part by mass and less than or equal to 8 parts by mass, based on 100 parts by mass of the above-mentioned pigment. When the content of the phthalocyanine derivative having a specific structure is more than or equal to 1 part by mass, the dispersibility of the pigment can be further improved, and when the content thereof is less than or equal to 20 parts by mass, the generation of foreign matter caused by the phthalocyanine derivative can be further suppressed.

1.3.2. Other Pigment Dispersing Agents

It is preferable that the non-aqueous ink composition according to the present embodiment contains another pigment dispersant other than the phthalocyanine derivative having a specific structure. An example of the pigment dispersant other than the phthalocyanine derivative having a specific structure includes a resin dispersant or the like.

The resin dispersant can further improve the dispersibility of the pigment by the synergistic effect with the phthalocyanine derivative having a specific structure.

Examples of the resin dispersant include polyvinyl alcohols, polyacrylic acid, acrylic acid-acrylonitrile copolymers, vinyl acetate-acrylic ester copolymers, acrylic acid-acrylic ester copolymers, styrene-acrylic acid copolymers, styrene-methacrylic acid copolymers, styrene-methacrylic acid-acrylic ester copolymers, styrene-α-methyl styrene-acrylic acid copolymers, styrene-α-methyl styrene-acrylic acid-acrylic ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymers, and salts thereof. Among these, copolymers of monomers having a hydrophobic functional group and monomers having a hydrophilic functional group and copolymer of monomers having both a hydrophobic functional group and a hydrophilic functional group are preferable. As the form of the copolymer, any form of a random copolymer, a block copolymer, an alternating copolymer, and a graft copolymer can also be used.

As the resin dispersant, commercially available products thereof can also be used, and examples of the commercially available products thereof include polyester-based polymer compounds such as Hinoakuto KF1-M, T-6000, T-7000, T-8000, T-8350P, and T-8000E (all are manufactured by Takeo Fine Chemical Co., Ltd.); Solsperse 20000, Solsperse 24000, Solsperse 32000, Solsperse 32500, Solsperse 33500, Solsperse 34000, Solsperse 35200, and Solsperse 37500 (all are manufactured by LUBRIZOL Corporation); Disperbyk-161, Disperbyk-162, Disperbyk-163, Disperbyk-164, Disperbyk-166, Disperbyk-180, Disperbyk-190, Disperbyk-191, Disperbyk-192, Disperbyk-2091, and Disperbyk-2095 (all are manufactured by BYK Japan Co., Ltd.); Flowlen DOPA-17, Flowlen DOPA-22, and Flowlen DOPA-33, and G-700 (all are manufactured by Kyoeisha chemical Co., Ltd.); AJISPER PB821, and AJISPER PB711 (all are manufactured by Ajinomoto Co., Inc.); and LP4010, LP4050, LP4055, POLYMER 400, POLYMER 401, POLYMER 402, POLYMER 403, POLYMER 450, POLYMER 451, and POLYMER 453 (all are manufactured by EFKA Chemicals, Inc.).

When the non-aqueous ink composition contains the resin dispersant, the content thereof is preferably more than or equal to 5 parts by mass and less than or equal to 200 parts by mass, and more preferably more than or equal to 30 parts by mass and less than or equal to 120 parts by mass, based on 100 parts by mass of the pigment.

1.4. Resin

It is preferable that the non-aqueous ink composition according to the present embodiment contains a resin. The function of the resin is to form a film to improve the abrasion resistance of the image obtained by the non-aqueous ink composition. In some cases, such a resin is referred to as a resin for fixing.

Examples of the resin include (meth)acrylic resins, vinyl chloride resins, aliphatic polyesters, aromatic polyesters, polyurethanes, epoxy resins, polyvinyl acetate, ethylene-vinyl acetate copolymer resins, polycarbonate, polyvinyl butyral, polyvinyl alcohols, phenoxy resins, ethyl cellulose resins, cellulose acetate propionate resins, cellulose acetate butyrate, nitrocellulose resins, polystyrene, vinyl toluene-α-methyl styrene copolymer resins, polyamides, polyimides, polysulfone resins, petroleum resins, chlorinated polypropylene, polyolefin, terpene resins, rosin-modified phenolic resins, various synthetic rubbers such as NBR, SBR, and MBR, and modified products thereof. These resins may be used alone or in a mixture of two or more thereof.

Among the above resins, it is preferable to use at least one of (meth)acrylic resin and vinyl chloride resin in terms of further improving the abrasion resistance of an image. Particularly, when (meth)acrylic resin is used in combination with vinyl chloride resin, there is a tendency to further improve the abrasion resistance of the recorded image.

The (meth)acrylic resin is a polymer obtained from commonly known monomer components. Examples of such monomer components include acrylic acid esters, such as methyl acrylate, ethyl acrylate, isopropyl acrylate, n-butyl acrylate, and 2-ethylhexyl acrylate; methacrylic acid esters, such as methyl methacrylate, ethyl methacrylate, isopropyl methacrylate, n-butyl methacrylate, isobutyl methacrylate, tert-butyl methacrylate, cyclohexyl methacrylate, and 2-ethylhexyl methacrylate; carboxyl group-containing monomer, such as acrylic acid, methacrylic acid, maleic acid, fumaric acid, itaconic acid, mono-n-butyl maleate, mono-n-butyl fumarate, and mono-n-butyl itaconate; hydroxyl group-containing (meth)acrylate; amide group-containing monomers; glycidyl group-containing monomers; cyano group-containing monomers; hydroxyl group-containing allyl compounds; tertiary amino group-containing monomers; and alkoxysilyl group-containing monomers. These monomer components may be used alone or in a combination thereof. In the invention, (meth)acrylic acid is assumed to mean both acrylic acid and methacrylic acid, and (meth)acrylate is assumed to mean both acrylate and methacrylate.

As the (meth)acrylic resin, the commercially available products thereof may be used, and examples of the commercially available products thereof include ACRYPET MF (trade name, manufactured by Mitsubishi Rayon Co., Ltd., acrylic resin), SUMIPEX LG (trade name, manufactured by Sumitomo Chemical Co., Ltd., acrylic resin), Paraloid B-series (trade name, manufactured by Rohm and Haas Co., Ltd., acrylic resins), and parapet G-1000P (trade name, manufactured by Kuraray Co., acrylic resin).

The vinyl chloride resin includes at least vinyl chloride as a monomer component used in the synthesis of the resin. As the vinyl chloride resin, copolymers of vinyl chloride and other monomers (for example, vinyl acetate, vinylidene chloride, acrylic acid, maleic acid, vinyl alcohol, and the like) may be used. Among these copolymers, it is preferable to use a vinyl chloride-vinyl acetate copolymer obtained by copolymerizing vinyl chloride and vinyl acetate, and it is more preferable to use a vinyl chloride-vinyl acetate copolymer having a glass transition temperature (Tg) of higher than or equal to 60° C. and lower than or equal to 80° C.

As the vinyl chloride resin, the commercially available products thereof may be used, and examples of the commercially available products thereof include Kanevinyl HM515, S-400 (trade name, manufactured by Kaneka Corporation), and SOLBIN C (trade name, manufactured by Nissin Chemical Co., Ltd.).

As the resin contained in the non-aqueous ink composition, any type of resin of solid, solution-state, and emulsion-state resin can also be used.

The content of the resin based on solid content is preferably more than or equal to 0.5 mass % and less than or equal to 10 mass %. The upper limit thereof is more preferably less than or equal to 6 mass %, and still more preferably less than or equal to 5 mass %. The lower limit thereof is more preferably more than or equal to 1 mass %, and still more preferably more than or equal to 2 mass % based on the total mass (100 mass %) of the non-aqueous composition. When the content of the resin is more than or equal to 0.5 mass %, the abrasion resistance of an image tends to be improved. In addition, when the content of the resin is less than or equal to 10 mass %, the viscosity of ink can be easily set to a range suitable for ink jet recording. Moreover, in addition to the securement of the abrasion resistance of an image, it is possible to contain a number of other components such as an organic solvent and the like with the decrease in the content of the resin, which is preferable in terms of increasing degree of freedom in design.

1.5. Surfactant

The non-aqueous ink composition according to the present embodiment may contain a surfactant from the viewpoint of decreasing surface tension to improve the wet-spreading property on a recording medium. Examples of the surfactant include a silicon-based surfactant, a fluorine-based surfactant, and a nonionic surfactant, each of which is a polyoxyethylene derivative.

As the silicon-based surfactant, it is preferable to use polyester-modified silicon or polyether-modified silicon. Specific examples thereof include BYK-347 and 348, and BYK-UV3500, 3510, 3530, and 3570 (all are manufactured by BYK Japan Co., Ltd.).

As the fluorine-based surfactant, it is preferable to use a fluorine-modified polymer. A specific example thereof includes BYK-340 (manufactured by BYK Japan Co., Ltd.).

As the polyoxyethylene derivative, it is preferable to use an acetylene glycol-based surfactant. Specific examples thereof include Surfynol 82, 104, 465, and 485, and TG (all are manufactured by Air Products Japan, Inc.), Olfine STG and E1010 (all are manufactured by Nissin Chemical Co., Ltd.), Nissan nonionic A-10R and A-13R (all are manufactured by NOF Co., Ltd.), Flowlen TG-740W and D-90 (all are manufactured by Kyoeisha chemical Co., Ltd.), and NOIGEN CX-100 (manufactured by Dai-ichi Kogyo Seiyaku Co., Ltd.).

When the non-aqueous ink composition contains the surfactant, the content thereof may be more than or equal to 0.1 mass % and less than or equal to 5 mass % based on the total mass (100 mass %) of the non-aqueous composition.

1.6. Other Components

The non-aqueous ink composition according to the present embodiment may contain materials for imparting predetermined performance, such as amines, various salts, polymerizable compounds, pH adjusting agents, chelating agents, preservatives, antifungal agents, rust inhibitors, and the like, in addition to the above-mentioned components.

1.7. Preparation of Non-Aqueous Ink Composition

The non-aqueous ink composition according to the present embodiment has a surface tension of preferably greater than or equal to 20 mN/m and less than or equal to 50 mN/m and more preferably greater than or equal to 25 mN/m and less than or equal to 40 mN/m at 20° C. from the viewpoint of balance between recording quality and reliability as ink for ink jet recording. In addition, the measurement of surface tension can be performed by confirming the surface tension when a platinum plate is wetted with ink in an environment of 20° C. using the automatic surface tension meter CBVP-Z (manufactured by Kyowa Interface Science Co., Ltd.).

In addition, from the same point of view, the viscosity of the non-aqueous ink composition at 20° C. is preferably greater than or equal to 2 mPa·s and less than or equal to 15 mPa·s, and more preferably greater than or equal to 2 mPa·s and less than or equal to 10 mPa·s. The measurement of viscosity can be performed by raising a shear rate to a range of 10 to 1000 and reading the viscosity at a shear rate of 200 under an environment of 20° C. using the Viscoelasticity testing machine MCR-300 (manufactured by Pysica Inc.).

1.8. Properties of Non-Aqueous Ink Composition

The non-aqueous ink composition according to the present embodiment is obtained by mixing the above-mentioned components in any order and filtering the mixture if necessary to remove impurities. As the method of mixing the components, a method of sequentially putting raw materials into a container equipped with a stirring device such as a mechanical stirrer, a magnetic stirrer, or the like and then stirring and mixing these raw materials is suitably used. As the filtration method, centrifugal filtration, filter filtration, or the like can be performed if necessary.

2. Ink Jet Recording Method

The ink jet recording method according to an embodiment of the invention includes a process of ejecting droplets of the non-aqueous ink composition from a recording head to adhere the droplets onto a recording medium (hereinafter, referred to as "process (a)"). Thus, recorded matter having an image formed on the recording medium is obtained.

According to the ink jet recording method of the present embodiment, since the above non-aqueous ink composition is used, the ejection performance of ink is excellent due to the reduction of generation of foreign matter, and an image having an excellent fixing property can be recorded.

In the ink jet recording method according to the present embodiment, it is preferable that the process (a) is carried out on the recording medium heated to higher than or equal to 30° C. and lower than or equal to 50° C. When the above-mentioned ink composition adheres onto this heated recording medium, the drying property of ink can be improved.

In addition, the ink jet recording method according to the present embodiment may further include an after-heating process of further heating the recording medium (hereinafter, referred to as "process (b)") after the process (a). Due to the process (b), the drying property of ink can be further improved.

As an ink jet recording apparatus that can include the above-mentioned processes, any apparatus for ejecting droplets of the above-mentioned ink composition from fine nozzles of a recording head to adhere the droplets onto a recording medium can be used. Hereinafter, as an ink jet recording apparatus that can be used in the present embodiment, an ink jet printer having a mechanism capable of heating a recording medium, as an example, will be described.

FIGURE is a perspective view showing a configuration of an ink jet printer (hereinafter, simply referred to as "printer") that can be used in the present embodiment. The printer 1 shown in FIGURE is called a serial printer. This serial printer refers to a printer in which a recording head is mounted on a carriage moving in a predetermined direction and in which droplets are ejected onto a recording medium by moving the recording head with the movement of the carriage.

As shown in FIGURE, the printer 1 includes: a carriage 4 mounted with a recording head 2 and detachably mounting an ink cartridge 3; a platen 5 disposed under the recording head 2 to transport a recording medium P; a heating mechanism 6 for heating the recording medium P; a carriage moving mechanism 7 for moving the carriage 4 in the medium width direction of the recording medium P; and a medium feeding mechanism 8 for transporting the recording medium P in a medium feed direction. Further, the printer 1 includes a control unit CONT for controlling the entire operation of the printer 1. The medium width direction refers to a main scanning direction (head scanning direction). The medium feeding direction refers to a sub-scanning direction (direction perpendicular to the main scanning direction).

The ink cartridge 3 is composed of four independent cartridges. Each of the four cartridges is filled with the above-mentioned non-aqueous ink composition. In the example of FIGURE, the number of cartridges is four, but is not limited thereto, and it is possible to mount the desired number of cartridges.

The ink cartridge 3 is not limited to those mounted in the carriage 4, as shown in FIGURE. For example, instead of this ink cartridge 3, a type of ink cartridge, in which ink is supplied to the recording head 2 through an ink supply tube mounted on the housing side of the printer 1, may be used.

The carriage 4 is configured to be mounted in a state of being supported by a guide rod 9 which is a support member that is laid in the main scanning direction. In addition, the carriage 4 is configured to be moved along the guide rod 9 in the main scanning direction by the carriage moving mechanism 7. In the example of FIGURE, it is shown that the carriage 4 moves in the main scanning direction, but is not limited thereto, and the carriage 4 may move in the sub-scanning direction.

The installation location of the heating mechanism 6 is not particularly limited as long as the heating mechanism is installed at a location at which the recording medium P can be heated. In the example of FIGURE, the heating mechanism 6, on the platen 5, is installed at a location facing the recording head 2. In this way, when the heating mechanism 6 is installed at the location facing the recording head 2, the adhering location of droplets on the recording medium P can be accurately heated, and thus the droplets adhered onto the recording medium P can be efficiently dried.

As the heating mechanism 6, for example, a print heater mechanism for heating the recording medium P by bringing the recording medium P into contact with a heat source, a mechanism for radiating infrared rays or microwaves (electromagnetic waves having a maximum wavelength of about 2,450 MHz), a drier mechanism for blowing hot air, or the like can be used.

The heating of the recording medium P by the heating mechanism 6 is performed before droplets ejected from nozzle holes (not shown) are adhered onto the recording medium P or when the droplets are adhered onto the recording medium P. In this way, the droplets adhered onto the recording medium P can be quickly dried. In addition, the control of heating conditions (For example, timing of heating implementation, heating temperature, heating time, and the like) are performed by the control unit CONT.

It is preferable in terms of improvement of the drying property of ink and prevention of the deformation of the recording medium that the heating of the recording medium P by the heating mechanism 6 is performed so that the recording medium P maintains a temperature range of higher than or equal to 30° C. and lower than or equal to 50° C. In the invention, the temperature for heating the recording medium means the temperature of the surface of the recording surface of the recording medium at the time of heating.

The printer 1 may further include a second heating mechanism (not shown) in addition to the heating mechanism 6. When the printer 1 includes the second heating mechanism, the above-mentioned process (b) can be carried out by this printer 1. The second heating mechanism is located downstream of the heating mechanism 6 in the transport direction of the recording medium P. The second heating mechanism performs the heating of the recording medium P after the recording medium P is heated by the heating mechanism 6, in other words, after droplets ejected from nozzle holes (not shown) are adhered onto the recording medium P. Thus, the drying property of droplets of the ink composition adhered onto the recording medium P can be further improved. As the second heating mechanism, any of the mechanisms (for example, drier mechanism and the like) described in the heating mechanism 6 can be used.

For the same reason as the heating mechanism 6, it is preferable that the heating of the recording medium P by the second heating mechanism is performed so that the recording medium P maintains a temperature range of higher than or equal to 30° C. and lower than or equal to 50° C.

A linear encoder 10 is used in detecting the position of the carriage 4 on the main scanning direction with signals. These detected signals are transmitted to the control unit CONT as position information. The control unit CONT is adapted to recognize the scanning position of the recording head 2 based on the position information from this linear encoder 10 and control the recording operation (ejecting operation) by the recording head 2. In addition, the control unit CONT is configured to control the moving speed of the carriage 4 in a variable control mode.

The recording medium P is not particularly limited. However, according to the ink jet recording method of the present embodiment, the abrasion resistance and the drying property of the recorded image become good even when a low-absorptive recording medium is used as the recording medium P. Here, the "low-absorptive recording medium" may be a recording medium having an amount of water absorption of less than or equal to 10 mL/m$^2$ from the start of contact until 30 msec$^{1/2}$ in Bristow's method, and at least a recording surface thereof may have these properties. According to this definition, in the "low-absorptive recording medium" in the invention, a non-absorptive recording medium that does not absorb water at all is also included. This Bristow's method is the most common method as a method of measuring the amount of liquid absorption in a short period of time and is also employed in Japan Technical Association of the Pulp and Paper Industry (JAPAN TAPPI). The details of the test method are described in Standard No. 51, "Paper and Paperboard—Liquid Absorption Test Method—Bristow's method" of "JAPAN TAPPI Paper Pulp Test Methods, 2000 version".

Specific examples of the low-absorptive recording medium include a sheet, a film, a textile, and the like, each containing a low-absorptive material. In addition, the low-absorptive recording medium may be a recording medium including a low-absorptive material-containing layer (hereinafter, referred to as "low-absorptive layer") on the surface of a substrate (for example, paper, fiber, leather, plastic, glass, ceramics, metal, or the like). The low-absorptive material is not particularly limited, but examples thereof include olefin resins, ester resins, urethane resins, acrylic resins, vinyl chloride resins, and the like.

Among these, a recording medium having a recording surface containing a vinyl chloride resin can be preferably used as the low-absorptive recording medium. The above-mentioned non-aqueous ink composition contains the compound represented by General Formula (1), and this compound dissolves the recording surface containing a vinyl chloride resin to enable the ink composition to permeate into the recording medium. Thus, it is possible to further improve the abrasion resistance of images and characters recorded on the recording surface containing a vinyl chloride resin. Specific examples of the vinyl chloride resin include polyvinyl chloride, vinyl chloride-ethylene copolymer, vinyl chloride-vinyl acetate copolymer, vinyl chloride-vinyl ether copolymer, vinyl chloride-vinylidene chloride copolymer, vinyl chloride-maleic acid ester copolymer, vinyl chloride-(meth)acrylic acid copolymer, vinyl chloride-(meth)acrylic acid ester copolymer, and vinyl chloride-urethane copolymer. In addition, various characteristics, such as thickness, shape, color, softening temperature, hardness, and the like, of the low-absorptive recording medium are not particularly limited.

3. Examples

Hereinafter, the invention will be described in more detail with reference to the following Examples and Comparative Examples. However, the invention is not limited to these Examples.

3.1. Synthesis of Organic Solvent 3.1.1. Compound Represented by the Following Formula (2)

19.828 g of N,N-dimethyl acrylamide and 6.408 g of methanol were put into a 300 mL separable flask equipped with a stirrer, a thermocouple and a nitrogen gas inlet tube, and stirred while introducing nitrogen gas. Subsequently, 0.338 g of sodium t-butoxide was added, and a reaction was performed at 35° C. for 4 hours. After heating, 150 mg of phosphoric acid was added, and the solution was made uniform and then left for 3 hours. The solution was filtered to remove precipitates, and unreacted materials was further removed by an evaporator. In this way, a compound represented by the following Formula (2) (hereinafter, referred to as "organic solvent A") was obtained.

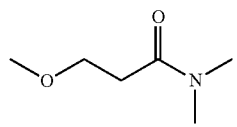

(2)

The HLB value of the obtained organic solvent A calculated by Equation (i) above based on the I/O value in the organic conceptual diagram was 18.3.

3.1.2. Compound Represented by the Following Formula (3)

19.828 g of N,N-dimethyl acrylamide and 14.824 g of 1-butanol were put into a 300 mL separable flask equipped with a stirrer, a thermocouple and a nitrogen gas inlet tube, and stirred while introducing nitrogen gas. Subsequently, 0.338 g of sodium t-butoxide was added, and a reaction was performed at 35° C. for 4 hours. After heating, 150 mg of phosphoric acid was added, and the solution was made uniform and then left for 3 hours. The solution was filtered to remove precipitates, and unreacted materials were further removed by an evaporator. In this way, a compound represented by the following Formula (3) (hereinafter, referred to as "organic solvent B") was obtained.

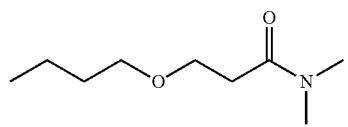

(3)

The HLB value of the obtained organic solvent B calculated by Equation (i) above based on the I/O value in the organic conceptual diagram was 12.2.

3.2. Preparation of Non-Aqueous Ink Composition

In a container, only an organic solvent was stirred in an amount corresponding to the concentration described in Table for each ink to obtain a mixed solvent. A part of the obtained mixed solvent was added with Solsperse 12000 or Solsperse 5000 (all are trade names, manufactured by LUBRIZOL Corporation), Solsperse 37500 (trade name, manufactured by LUBRIZOL Corporation), and a pigment in predetermined amounts, was preliminarily dispersed using a homogenizer, and was then further dispersed by a bead mill filled with zirconia beads having a diameter of 0.3 mm to obtain a pigment dispersion having an average pigment particle diameter of 130 nm. Meanwhile, a part of the mixed solvent was added with a resin and stirred, and then the resin was completely dissolved in the mixed solvent to obtain a resin solution. The above pigment dispersant was mixed with the remainder of the mixed solvent, a surfactant, and the obtained resin solution, stirred for 1 hour, and then filtered using a PTFE-made membrane filter of 5 μm to obtain non-aqueous ink compositions of Examples and Comparative Examples.

Among the components used in Table, components described in trade names or abbreviations are as follows.

PB-7 (C.I. Pigment Black 7, carbon black)

Solsperse 37500 (trade name, manufactured by LUBRIZOL Corporation, resin dispersant)

Solsperse 12000 (trade name, manufactured by LUBRIZOL Corporation, copper phthalocyanine derivative provided with sulfonic acid group)

Solsperse 5000 (trade name, manufactured by LUBRIZOL Corporation, copper phthalocyanine derivative provided with a ammonium salt)

Organic solvent A (compound represented by the above Formula (2))

Organic solvent B (compound represented by the above Formula (3))

DPGmME (dipropylene glycol monomethyl ether, normal boiling point 187° C.)

TetraEGmBE (tetraethylene glycol monobutyl ether, normal boiling point 300° C.)

DEGdEE (diethylene glycol diethyl ether, normal boiling point 189° C.)

BYK340 (trade name, manufactured by BYK Japan Co., Ltd., a fluorine-based surfactant)

HM515 (trade name "Kanevinyl HM515", manufactured by Kaneka Corporation, vinyl chloride-vinyl acetate copolymer) G-1000P (trade name "Parapet G-1000P", methacrylic resin)

3.3. Evaluation Test

In an evaluation test, the evaluation of uneven printing, glossiness, dot size and friction fastness was performed under the following conditions. The temperature and relative humidity in an environmental test chamber was adjusted to 25° C. and 65% RH, respectively, using an air conditioner and a humidifier, and an ink jet printer "SC-S30650" (trade name, manufactured by Seiko Epson Corporation) was installed in this environmental test chamber and then used. In addition, temperature and humidity was measured by a temperature and humidity sensor which was installed on a casing and which was not influenced by the heat generation of an ink jet printer itself such as a heater.

In each evaluation test, a recording medium was heated to 45° C. for 1 minute by a platen and a recording medium discharge unit located downstream of the platen during recording and after recording.

3.3.1. Storage Stability of Ink (Viscosity Change and Generation of Foreign Matter)

An ink cartridge for the printer SC-S30650 manufactured by Seiko Epson Corporation was filled with each non-aqueous ink composition, and was left for 2 weeks under an environment of 60° C. and 80%. Thereafter, an ink was taken out from the ink jet cartridge, and the viscosity thereof was measured by the viscometer (trade name "MCR300") manufactured by Anton Paar Corporation when the temperature of the ink was set to 20° C. When the change of viscosity to the initial viscosity (measured at an ink temperature of 20° C.) was 0.1 mPa·s or more, it was determined by X, and when the change of viscosity to the initial viscosity was less than 0.1 mPa·s, it was determined by O.

In addition, whether foreign matter was precipitated in the ink after leaving was observed by an electron microscope to confirm whether foreign matter derived from a copper phthalocyanine derivative was present.

3.3.2. Uneven Printing

Each non-aqueous ink composition was solid-printed on a PVC banner sheet (model number IJ51 (polyvinyl chloride), manufactured by 3M Co., Ltd.) at a concentration of 100% of a recording resolution of 720×720 dpi using the above printer, and was then dried for 60 minutes at a relative humidity (RH) of 65% at 25° C. Thereafter, the printed surface was observed using a visual manner and an optical microscope. In this case, when uneven printing was rarely performed, it was set to six points, and the degree of uneven printing was evaluated at a level of six points to one point.

3.3.3. Glossiness

Each non-aqueous ink composition was solid-printed on a glossy polyvinyl chloride sheet (model number SV-G-1270G, manufactured by Roland DG Corporation) at a concentration of 100% of a recording resolution of 720×720 dpi using the above printer, and was then dried for 1 day at a relative humidity (RH) of 65% at 25° C. to create recorded matter. Then, the 20° gloss of the solid printed portion was measured by MULTI GLOSS 268 (manufactured by Konica Minolta Co., Ltd.). In this case, when the glossiness of the solid printed portion was less than 26, it was set to one point, and when the glossiness thereof was more than or equal to 26 and less than 28, it was set to two points, thereby evaluating the glossiness by the score every two times. When gloss is excellent, particularly, in a recording medium having excellent glossiness such as a film, there is an advantage of the recorded matter having the same glossiness as the recording medium itself.

3.3.4. Dot Size

Each non-aqueous ink composition was printed on a PVC banner sheet (model number IJ51 (polyvinyl chloride), manufactured by 3M Co., Ltd.) in the shape of a square having one side of 3 cm at a concentration of 30% of a recording resolution of 720×720 dpi using the above printer, and was then dried for 60 minutes at a relative humidity (RH) of 65% at 25° C. Thereafter, the dot size of the printed portion was observed using an optical microscope, and the diameters of dots were classified with respect to each 10 μm. When bleeding was large, measurement could not be performed without setting the dot shape to a circle. Further, when bleeding became small, the dot shape became close to a perfect circle, but the dot size (diameter) became smaller. When the dot size was less than or equal to 20 μm, one point was set, and when the dot size was more than 20 μm and less than or equal to 30 μm, two points were set. The dot sizes were ranked with respect to each 10 μm to calculate the score thereof. The fact that dot size is good means that the wet-spreading property of ink on the recording medium is good. There is an advantage of the color developing properties of the recorded matter becoming better when the recording medium can be covered with ink.

3.3.5. Friction Fastness

Each non-aqueous ink composition was printed on a glossy polyvinyl chloride sheet (model number SV-G-1270G, manufactured by Roland DG Corporation) at a concentration of 100% of a recording resolution of 720×720 dpi using the above printer, and was then dried for 1 day at a relative humidity (RH) of 65% at 25° C. to create dried recorded matter. Next, the dry test of the recorded matter was performed by an I type testing machine, based on JIS L 0849. Then, the OD of a test cotton cloth was measured by Spectrum trolley Bruno (manufactured by Gretag Macbeth Co., Ltd.). In this case, when the OD thereof was 0.4 or more, one point was granted, and when the OD thereof was less than 0.4 and more than or equal to 0.35, two points were granted. That is, color transfer was scored with respect to each 0.05.

3.4. Evaluation Result

The results of the above evaluation tests are shown in Table below.

TABLE

| Non-aqueous ink composition | | | Examples | | | | | | | Comparative Examples | | |
|---|---|---|---|---|---|---|---|---|---|---|---|---|
| | | | 1 | 2 | 3 | 4 | 5 | 6 | 7 | 1 | 2 | 3 |
| Pigment | | PB-7 | 4 | 4 | 4 | 4 | 4 | 4 | 4 | 4 | 4 | 4 |
| Pigment dispersant | Resin dispersant | Solsperse37500 | 4 | 4 | 4 | 4 | 4 | 4 | 4 | 4 | 4 | 4 |
| | Pigment derivative | Solsperse12000 | 0.2 | 0.2 | 0.2 | 0.2 | 0.2 | 0.2 | 0.2 | | 0.2 | |
| | | Solsperse5000 | | | | | | | | | | 0.2 |
| Organic solvent | | Organic solvent A | 20 | 20 | 20 | 40 | 35 | | 45 | 20 | | 20 |
| | | Organic solvent B | | | | | | 20 | | | | |
| | | DPGmME | 15 | 30 | 30 | 10 | 18 | 15 | | 15 | 45 | 15 |
| | | TetraEGmBE | 15 | | | | 18 | 15 | | 15 | | 15 |
| | | DEGdEE | 33.8 | 33.8 | 29.8 | 35.8 | 12.8 | 33.8 | 38.8 | 34 | 38.8 | 33.8 |
| Surfactant | | BYK340 | 2 | 2 | 2 | 2 | 2 | 2 | 2 | 2 | 2 | 2 |
| Resin | | HM515 | 4 | 4 | 8 | 2 | | 4 | 4 | 4 | 4 | 4 |
| | | G-1000P | 2 | 2 | 2 | 2 | 6 | 2 | 2 | 2 | 2 | 2 |
| Total (mass %) | | | 100 | 100 | 100 | 100 | 100 | 100 | 100 | 100 | 100 | 100 |
| Evaluation result | Image quality | Uneven printing | 5 | 6 | 6 | 6 | 4 | 5 | 6 | 5 | 2 | 5 |
| | | Glossiness | 6 | 6 | 5 | 5 | 6 | 6 | 3 | 6 | 6 | 6 |
| | | Dot size | 6 | 5 | 5 | 5 | 6 | 6 | 2 | 6 | 6 | 6 |
| | Friction fastness | | 5 | 5 | 6 | 5 | 4 | 5 | 6 | 5 | 3 | 5 |
| | Storage stability | Viscosity change | O | O | O | O | O | O | O | X | O | O |
| | | Generation of foreign matter | no | no | no | no | no | no | no | no | no | yes |

In all of the non-aqueous ink compositions of Examples, it was found that the generation of foreign matter and the change of viscosity rarely occurred (that is, the non-aqueous ink compositions were excellent in storage stability), and the abrasion resistance of the recorded image was excellent. Further, in all of the non-aqueous ink composition of Examples, it was found that, since the content of a phthalocyanine derivative having a specific structure was within a range of more than or equal to 1 part by mass and less than or equal to 20 parts by mass based on 100 parts by mass of a pigment, viscosity change was further decreased, and the generation of foreign matter was also further decreased, compared to the non-aqueous ink composition (not shown in Table) in which the content of the phthalocyanine derivative having a specific structure was outside the above range.

In the non-aqueous ink composition of Example 7, it was found that, since this composition did not contain alkylene glycol monoalkyl ether, dot size was insufficient, and thus image quality was deteriorated.

Meanwhile, in the non-aqueous ink composition of Comparative Example 1, it was found that this composition did not contain a pigment derivative, and thus the viscosity change of ink increases and the storage stability is not excellent.

In the non-aqueous ink composition of Comparative Example 2, it was found that this composition did not contain a compound represented by General Formula (1), and thus the abrasion resistance of the recorded image was deteriorated. Further, in the non-aqueous ink composition of Comparative Example 2, it was found that the drying property of an image was deteriorated with the increase of the content of alkylene glycol monoalkyl ether, and thus evaluation of uneven printing became poor.

In the non-aqueous ink composition of Comparative Example 3, it was found that a phthalocyanine derivative having an amine structure, not a phthalocyanine derivative having a specific structure, was used as a pigment derivative, and thus the generation of foreign matter was remarkably increased.

The invention can be variously modified without being limited to the above-mentioned embodiments. For example, the invention includes substantially the same configurations as those described in the embodiments (for example, configurations having the same function, method and result or configurations having the same object and effect). The invention includes configurations that replace non-essential parts of the configurations described in the embodiments. The invention includes configurations that can achieve the same action and effect as those described in the embodiments or the same purpose as the configurations described in the embodiments. The invention includes configurations obtained by applying known technologies to the configurations described in the embodiments.

The entire disclosure of Japanese Patent Application No.: 2014-014334, filed Jan. 29, 2014 is expressly incorporated by reference herein.

What is claimed is:

1. A non-aqueous ink composition for ink jet recording, comprising:
   a pigment;
   a compound represented by General Formula (1) below; and
   a phthalocyanine derivative provided with a polar group not having an amine structure, as a pigment dispersant for dispersing the pigment:

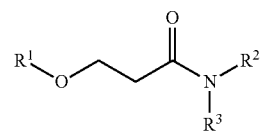

(1)

wherein $R^1$ indicates an alkyl group of 1 to 4 carbon atoms, and $R^2$ and $R^3$ each independently indicate a methyl group or an ethyl group.

2. The non-aqueous ink composition for ink jet recording according to claim 1,
   wherein the pigment is carbon black.

3. The non-aqueous ink composition for ink jet recording according to claim 1, further comprising an alkylene glycol monoalkyl ether.

4. The non-aqueous ink composition for ink jet recording according to claim 3,
   wherein the content of the alkylene glycol monoalkyl ether is more than or equal to 1 mass % and less than or equal to 40 mass %, based on the total mass of the non-aqueous ink composition.

5. The non-aqueous ink composition for ink jet recording according to claim 1,
   wherein the content of the compound represented by General Formula (1) above is more than or equal to 5 mass % and less than or equal to 50 mass %, based on the total mass of the non-aqueous ink composition.

6. The non-aqueous ink composition for ink jet recording according to claim 1, further comprising at least one resin of a vinyl chloride-based resin and a (meth)acryl-based resin.

7. The non-aqueous ink composition for ink jet recording according to claim 6,
   wherein the content of the resin is more than or equal to 0.5 mass % and less than or equal to 10 mass %, based on the total mass of the non-aqueous ink composition.

8. The non-aqueous ink composition for ink jet recording according to claim 1,
   wherein the content of the phthalocyanine derivative is more than or equal to 1 part by mass and less than or equal to 20 parts by mass, based on 100 parts by mass of the pigment.

9. The non-aqueous ink composition for ink jet recording according to claim 1, further comprising a compound other than the phthalocyanine derivative, as the pigment dispersant.

* * * * *